United States Patent [19]

Lu et al.

[11] Patent Number: 5,196,266
[45] Date of Patent: Mar. 23, 1993

[54] RECLOSABLE MECHANICAL FASTENER BASED ON A COMPOSITE ARTICLE

[75] Inventors: Shih-Lai Lu, Woodbury; James J. Kobe, Newport; John D. Moon, Hastings; Maurice E. Freeman, Maplewood, all of Minn.; Forrest J. Rouser, San Rafael, Calif.; Robert V. Heiti, St. Paul; Thomas E. Boettcher, Hastings, both of Minn.

[73] Assignee: Minnesota Mining and Manufacturing Company, St. Paul, Minn.

[21] Appl. No.: 573,321

[22] Filed: Aug. 29, 1990

Related U.S. Application Data

[63] Continuation-in-part of Ser. No. 427,448, Oct. 26, 1989, abandoned.

[51] Int. Cl.$^5$ .................. B32B 7/12; A41F 1/00; A44B 11/25
[52] U.S. Cl. .................... 428/355; 428/343; 24/575; 24/577; 24/578
[58] Field of Search ............. 24/575, 577, 578; 428/343, 355

[56] References Cited

U.S. PATENT DOCUMENTS

| | | | |
|---|---|---|---|
| 3,689,346 | 9/1972 | Rowland | 156/245 |
| 4,018,333 | 4/1977 | Blackwood | 206/343 |
| 4,329,384 | 5/1982 | Vesley et al. | 428/40 |
| 4,374,077 | 2/1983 | Kerfeld | 264/22 |
| 4,414,316 | 11/1983 | Conley | 430/496 |
| 4,420,502 | 12/1983 | Conley | 427/54.1 |
| 4,576,850 | 3/1986 | Martens | 428/156 |
| 4,643,730 | 2/1987 | Chen et al. | 604/390 |
| 4,875,259 | 10/1989 | Appeldorn | 24/576 |
| 4,887,339 | 12/1989 | Bellanger | 24/575 |
| 4,959,265 | 9/1990 | Wood et al. | 428/343 |

FOREIGN PATENT DOCUMENTS

0121430 10/1984 European Pat. Off. .
0187044 7/1986 European Pat. Off. .
62-112507 5/1987 Japan .

Primary Examiner—George F. Lesmes
Assistant Examiner—D. R. Zirker
Attorney, Agent, or Firm—Gary L. Griswold; Walter N. Kirn; David L. Weinstein

[57] ABSTRACT

A reclosable mechanical fastener comprising a fastening component having a surface structure by which two such fastening components can become releasably attached. The novel fastening component is a composite of a tough substrate and a fastening layer that forms said surface structure, which fastening layer is formed from a cured oligomeric resin composition having one or more like or different hard segments, one or more like or different soft segments, and one or more like or different monovalent moieties containing a radiation-sensitive, addition-polymerizable, function group. The novel fastener forms stronger linkages than were possible with similar fasteners of the prior art.

7 Claims, 2 Drawing Sheets

RECLOSABLE MECHANICAL FASTENER BASED ON A COMPOSITE ARTICLE

BACKGROUND OF THE INVENTION

This application is a continuation-in-part of application Ser. No. 07/427,448, filed Oct. 26, 1989 now abandoned.

1. Field of the Invention

The invention relates to reclosable mechanical fasteners and to a method of making a reclosable mechanical fastener.

2. Discussion of the Art

A widely used quick close/quick release reclosable mechanical fastener is the "Velcro" hook and loop fastener, available from Velcro USA, Inc., Manchester, N.H. Another widely used quick close/quick release reclosable mechanical fastener is the "Scotchmate" "Dual Lock" mushroom-shaped fastener, available from Minnesota Mining and Manufacturing Company. Although both of these fasteners have been shown to be extremely useful, they are characterized by several undesirable characteristics. When the fasteners are used with washable articles of clothing, the hook portion of the fasteners tends to snag the fabric during washing. Moreover, the hook and loop portions of the fasteners tend to collect lint. The cost of hook and loop or mushroom fasteners is sufficiently high to increase the cost of an article of clothing. These types of fasteners are not easy to manufacture. Finally, these types of fasteners are incapable of exhibiting a thin profile, which may detract from an aesthetic appearance. There is a desire and a need in the market place for a fastener that is as convenient to use as the "Velcro" fastener, and the "Scotchmate" fastener, has a thinner profile, lower cost, and lower potential for snagging. Another possible undesirable feature of the "Velcro" fastener is that it makes noise when it is opened. This feature makes it undesirable for military use in the field.

Another widely used reclosable fastener is the "Zip-Loc" fastener, which is particularly useful for reclosably sealing plastic bags. The major problem associated with "Zip-Loc" fasteners is that they are characterized by a tongue-and-groove arrangement. The tongue must be precisely aligned with the groove to close and seal the bag.

SUMMARY OF THE INVENTION

The invention involves a reclosable mechanical fastener comprising at least one fastening component. The fastening component of this invention can be fastened to itself, to an identical fastening component, or to a different article with which it can be mated.

Briefly, the fastening component of the fastener of this invention is a composite comprising (a) a substrate, and, adhered to the substrate, (b) a fastening layer comprising a cured oligomeric resin having one or more like or different hard segments, one or more like or different soft segments, and one or more like or different monovalent moieties containing a radiation-sensitive, addition-polymerizable, functional group, and further having a surface structure by which the fastening component can become releasably adhered to the fastening layer of an identical fastening component.

As compared to the "Velcro" fastener, the fastener of this invention can have a much thinner profile and can be opened almost without a sound. Furthermore, the "Velcro" fastener requires sellers to maintain inventories of both the hook element and the loop element, whereas the sellers of this invention only need to employ inventories of a single fastening component.

The invention also involves a method for making the fastening component of this invention through the use of a master negative molding surface having features that can be replicated to produce a fastening layer that has a surface structure by which the fastening component can become releasably adhered to the fastening layer of an identical fastening component. The method comprises the steps of:

(1) preparing a one-part, preferably solvent-free, composition comprising:
  (i) an ultraviolet radiation-curable organic oligomeric resin comprising:
    (a) one or more like or different segments, each hard segment preferably comprising a mono- or poly-valent moiety containing one or more carbocyclic or heterocyclic groups or both,
    (b) one or more like or different soft segments, each soft segment preferably comprising a mono- or poly-valent moiety selected from the group consisting of polyester, polyacrylate, polyether, and polyolefin, and
    (c) one or more like or different monovalent moieties containing a radiation sensitive, addition-polymerizable, functional group, said functional group preferably selected from the group consisting of acrylyl, methacrylyl, allyl, and vic-epoxy, and
  (ii) a photoinitiator;
(2) depositing that composition onto a master negative molding surface;
(3) applying a substrate over the composition;
(4) applying force to the substrate so as to evenly spread the composition between the substrate and the master negative molding surface; and
(5) curing the deposited composition by ultraviolet radiation to provide a composite of said substrate and cured composition.

During the curing step, it is preferred that the temperature of the composition be prevented from rising above 50° C.

Either the substrate or the master negative molding surface or both should be flexible; additionally, either the substrate or the master negative molding surface or both should be transparent to ultraviolet radiation.

The one-part composition of step (1) comprises (i) a radiation-curable, addition-polymerizable, crosslinkable, organic oligomeric resin having one or more like or different hard segments, one or more like or different soft segments, and one or more like or different monovalent moieties containing a radiation-sensitive, addition-polymerizable, functional group, and (ii) a photoinitiator. The hard segments preferably are polyurethane and the soft segments preferably are polyester. The concentration of the photoinitiator preferably ranges from about 0.1 to about 0.5% by weight of the composition.

DETAILED DESCRIPTION

Figure 1:
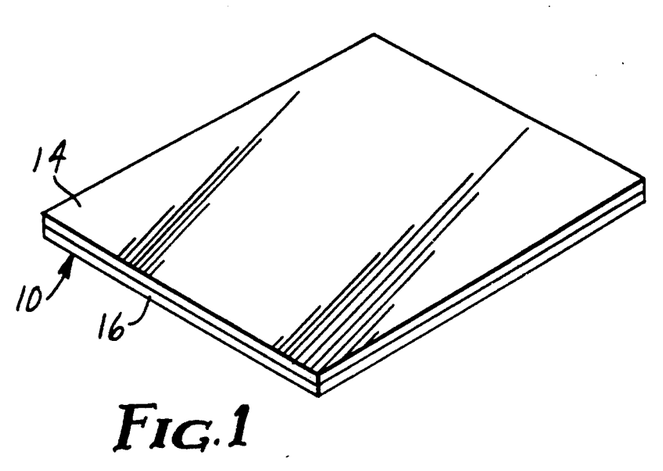
FIG. 1 is an isometric view of a composite fastening component of the present invention.
Figure 2:
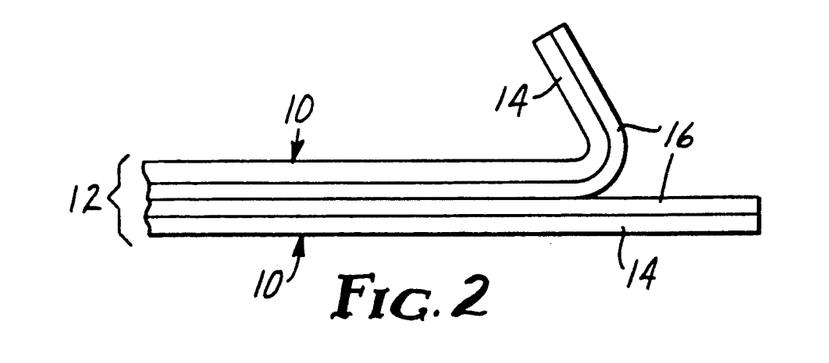
FIG. 2 is an edge view of two composite fastening components of the present invention being used as a reclosable mechanical fastener, which fastening components have a surface structure which is a uniformly flat layer.

Referring now to FIGS. 1 and 2, one embodiment of a fastening component 10 of the reclosable fastener 12 of the present invention comprises a substrate 14 bearing on at least one major surface thereof a fastening layer 16 formed from a composition comprising (i) a one-part, preferably solvent-free, radiation-curable, addition-polymerizable, crosslinkable, organic oligomeric resin having one or more like or different hard segments, one or more like or different soft segments, and one or more like or different monovalent moieties containing a radiation-sensitive, addition-polymerizable, functional group, and (ii) a photoinitiator.

It is preferred that substrate 14 be made of a polymeric material, more preferably, a thermoplastic film. The most preferred material for substrate 14 is biaxially oriented, corona treated, polypropylene film because it is inexpensive and has good tensile strength and reasonably good abrasion resistance. Substrate 14 should be of sufficient thickness to provide sufficient support to fastening layer 16. Substrate 14 is preferably at least 0.0125 mm thick, more preferably at least 0.03 mm thick, in order to provide both good strength and good handling properties to the composite fastening component of this invention. It is preferred that the substrate have a tensile strength of at least 1500 MPa. It is also preferred that the substrate be flexible, i.e., capable of being bent to a radius of 0.5 cm without breaking.

Another useful material for substrate 14 is oriented poly(ethyleneterephthalate) film, the surface of which has been treated to promote adhesion of the oligomeric resin thereto, e.g., by corona treatment. Other useful materials for substrate 14 for the fastening component of this invention include cellulose acetate butyrate, cellulose acetate propionate, poly(ether sulfone), poly(methylmethacrylate), polyurethane, poly(vinyl chloride), glass, paper, and metal.

Radiation-curable, addition-polymerizable, crosslinkable oligomeric resins useful in making fastening component 10 of reclosable fastener 12 of this invention include radiation-curable, addition-polymerizable, oligomers or prepolymers having (a) one or more like or different "hard" (rigid) segments ("H"), viz., mono- or poly- and preferably di-valent moieties containing one or more carbocyclic or heterocyclic groups or both and preferably difunctional linking groups with hydrogen-bonding capabilities, e.g., carbonyldioxy, —OC(O)O—, carbamato, —NHC(O)O—, ureylene, —NHCONH—, amido, —NHCO—, and oxy, —O—, said moieties when their valences are satisfied by protons, having at least one major transition temperature above 250° K., preferably above 350° K., said transition temperature being a glass transition temperature or crystalline melting point, such as are usually detected by differential thermal analysis or thermomechanical analysis, (b) one or more like or different "soft" (flexible) segments ("S"), viz., mono- or preferably, poly-valent moieties, such as a polyester, polysiloxane, polyacrylate, polyether or polyolefin segment, each of which has a number average molecular weight in the range of about 500 to 5000 and each of which in the form of homopolymer has a glass transition temperature below 250° K., and (c) one or more like or different monovalent moieties ("E") containing a radiation-sensitive, addition-polymerizable, functional group such as acrylyl, methacrylyl, allyl or vic-epoxy group. The amounts of "H", "S" and "E" segments or moieties in said oligomeric compositions are such that the radiation-cured crosslinked plastic derived therefrom preferably has dynamic shear moduli, over the temperature range of 23° to 123° C., on or within the boundary of area A-B-C-D of FIG. 1 of U S. Pat. No. 4,576,850, incorporated by reference. Where the oligomers contain two or more "H" segments, such segments can be the same or different, as is true of the "S" segments and the "E" moieties. Further, the oligomers are free of labile groups, viz., —O—O— and —N=N—, and generally will have a number average molecular weight of about 1000 to 30,000 grams per mole.

Martens, U.S. Pat. No. 4,576,850, which discloses crosslinkable polymers that are useful for preparing radiation-curable oligomer resins suitable for this invention, is incorporated herein by reference for the purpose of describing these crosslinkable polymers in greater detail.

The viscosity of the composition containing the oligomeric resin should be within the range of 1,000 to 5,000 cps in order to reliably replicate the master negative molding surface typically used to prepare fastening component 10 of this invention. At viscosities above 5,000 cps, air bubbles might become entrapped in the resin, and the composition containing the resin might not completely fill the features of the master molding surface. At viscosities belov 1,000 cps, the resin tends to shrink upon curing to such an extent that the composition containing the cured resin may not faithfully replicate the master molding surface. For this reason, it is preferable to avoid the use of solvents to lower viscosity. Preferably, the viscosity of the resin ranges from 2,000 to 3,000 cps. Within the preferred range, the composition containing the oligomeric resin should completely fill the features of the master molding surface without any need to apply pressure. However, when the features of the master molding surface are unusually deep or narrow, or both, it may be desirable to reduce the viscosity below 2,000 cps, because some shrinkage is to be preferred over any failure to fill the features completely.

In order to achieve the desired viscosity, it is usually necessary to include in the composition containing the oligomeric resin an ethylenically unsaturated monomer, such as an alkyl acrylate, preferably an alkyl acrylate wherein the alkyl group contains a straight chain having from 4 to 12 carbon atoms. It has been found that those monomers that increase the modulus of the resulting photopolymerized material provide a fastener that is too glassy in texture to permit satisfactory conformance or mating with a second fastener. Monomers that increase the modulus of the photopolymerized material include lower alkyl acrylates having less than four carbon atoms in the alkyl moiety, N-vinyl pyrrolidone, and N,N-dimethylamino ethyl acrylate. Fasteners employing these materials have peel values of substantially less than 0.75 pound per inch.

It is preferred that the photoinitiators be in powdered form, because powders are easier to dispense in precise amounts than are liquids. A preferred powdered photoinitiator that is commercially available at reasonable cost is 1-hydroxycyclohexyl acetophenone ("IRGACURE" 184, Ciba-Geigy Corporation). Another photoinitiator useful in the present invention is 2,2-dimethoxy-2-phenyl acetophenone ("IRGACURE" 651, Ciba-Geigy Corporation).

Fastening components 10 comprising a substrate 14 bearing fastening layer 16 containing cured oligomeric resin thereon can be formed in a variety of physical configurations. The simplest configuration, as shown in FIG. 1, is characterized by a planar substrate 14 bearing a planar fastening layer 16 containing cured oligomeric resin.

Figure 3:
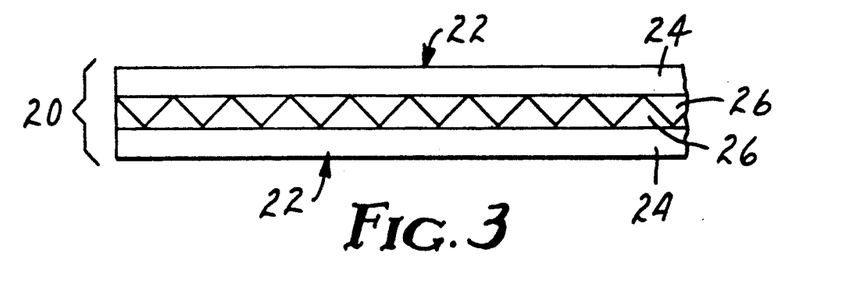
FIG. 3 is an edge view of two composite fastening components of the present invention being used as a reclosable mechanical fastener, which fastening components have surface structures that are intermeshable.

Referring now to FIG. 3, another important configuration for the reclosable mechanical fastener 20 of this invention is an intermeshable fastening component 22, comprising a substrate 24 and a fastening layer 26 containing cured oligomeric resin. The surface of fastening layer 26 consists of a plurality of solid tapered elements, each element having at least one side inclined relative to a common plane at an angle sufficient to form a taper such that each element may mesh with at least one corresponding element of an identical surface of a second fastening layer. A configuration similar to that shown in FIG. 3 is described in Assignee's U.S. Pat. No. 4,875,259, issued Oct. 24, 1989, which has a plurality of tapered elements, such that each element will mesh with another corresponding element and will be held together by a frictional force. U.S. Pat. No. 4,875,259 recites that the tangent of the half angle of the tapered elements must be equal to or less than the coefficient of friction of the contacting surfaces. It should be noted, however, that the tapered elements of the fastening component of the present invention need not satisfy any mathematical limitations, as does the tapered element in U.S. Pat. No. 4,875,259. It is not necessary for the tangent of the half angle of the tapered sides of those elements to be no greater than the coefficient of friction of the material of the contacting surfaces.

Turning now to the method of preparing the fastening components of this invention, a preferred master negative molding surface for use in the method of the present invention is a sheet of thermoplastic resin that has been embossed by a metallic master tool, such as one made of nickel-plated copper or brass. Although such a thermoplastic master is relatively inexpensive, it can be used to form a few thousand composite fastening components of the invention before becoming unduly worn. Furthermore, a thermoplastic master can be transparent to ultraviolet radiation, thereby permitting the oligomeric resin composition to be cured by being irradiated through the master. Hence, substrates of the composite fastening components can be opaque, e.g., have a reflective metallic or other coating or decorative imprinting, or be impregnated with a pigment or dye. If the substrate is rigid, it is preferred that the thermoplastic master have sufficient bulk and flexibility to permit it to be flexed to spread the oligomeric composition evenly over the substrate. If the substrate is not rigid, the thermoplastic master need not be flexible, as the substrate can be flexed to spread the oligomeric composition evenly over the master.

Assignee's copending application, U.S. Ser. No. 309,414, filed Feb. 10, 1989, discloses a method of producing plastic articles having optical utility from ultraviolet-curable oligomeric resin. The resin is deposited on a master negative molding surface in quantities barely sufficient to fill the cavities of the mold, filling the cavities by moving a bead of the resin between a substrate film and the mold, and then curing the resin by ultraviolet radiation through either the substrate film or the mold.

Figure 4:
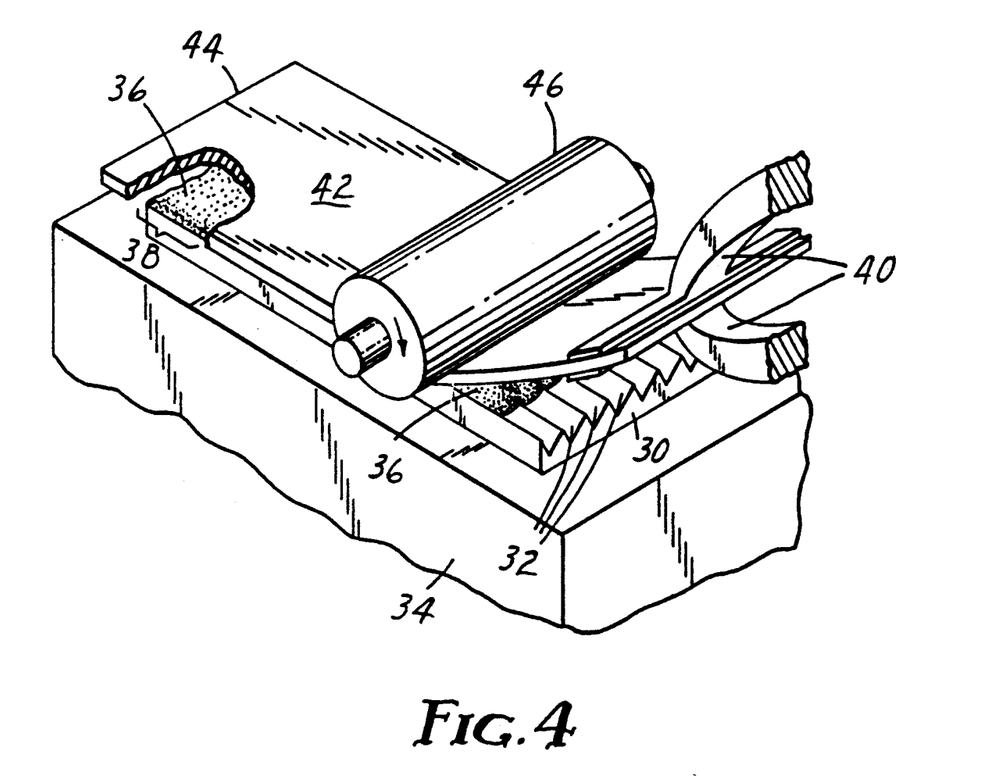
FIG. 4 shows apparatus useful for producing composite fastening components.

Referring to FIG. 4, a master 30 with its grooves 32 facing upwardly is laid on a flat table 34. A bead of radiation-curable resin composition 36 is deposited across one edge 38 of grooves 32 in an amount barely sufficient to fill the grooves completely. A clamp 40 is fastened along one edge of a flexible, transparent, plastic film 42, and the opposite edge 44 of the plastic film is laid onto bead of resin composition 36 to extend slightly beyond edge 38 of the grooves. A hard rubber roller 46 is brought into contact with edge 44 of plastic film 42 and rolled across plastic film 42, thereby advancing bead of resin composition 36 to fill grooves 32. After the radiation curable resin composition has been cured by being exposed to ultraviolet radiation through plastic film 42, clamp 40 is lifted to peel the resulting microstructure-bearing composite plastic article from master 30, thereby enabling the master to be reused.

The apparatus shown in FIG. 4 will provide fastening components of the type shown in FIG. 3, i.e., fastening components that are intermeshable. If it is desired to prepare fastening components of the type shown in FIG. 2, i.e., fastening components that are planar, the master should not have grooves.

A number of other patents also concern shaped plastic articles made by replicating a microstructure-bearing surface. See, for example, U.S. Pat. Nos. 3,689,346; 4,414,316; 4,420,502; and 4,374,077.

When the amount of the composition containing the oligomeric resin deposited in step (2) substantially exceeds the amount required to create the tapered elements, the resulting composite fastening component may not faithfully replicate the master molding surface because of too much shrinkage in curing step (5). In the groove-filling step, sufficient pressure should be applied to squeeze out excess resin composition so that the resin composition thickness above the grooves is preferably less than 20% of the depth of the grooves, more preferably no greater than 10%. The use of excessive amounts of the composition containing the oligomeric resin would also be uneconomical, because the oligomeric resin is typically much more expensive than the material of the substrate.

When the surface of the composite fastening component is flat or is substantially more shallow than would be useful for an intermeshable article, the cured composition preferably has a thickness of at least 0.025 mm to provide compliance to enable strong mechanical linkages to be made to an identical composite fastening component. When the cured composition is a uniformly flat layer having a thickness up to about 0.5 mm, shrinkage of the oligomeric resin during curing step (5) does not prevent the layer from adequately replicating the smoothness and flatness of a flat master molding surface. However, substantially thicker layers might not provide sufficiently faithful replication and might also result in undue expense.

When a substantially planar fastening member is desired, the composition containing the oligomeric resin can be coated directly on a suitable substrate to a desired thickness by means of, for example, a knife coater. The composition can then be covered with a second film and cured by means of ultraviolet radiation, or it can also be cured directly, without a cover film in a controlled oxygen atmosphere.

The temperature of the composition containing the oligomeric resin cannot be allowed to exceed 50° C. by a substantial amount because that would tend to result in shrinkage and, hence, imperfect replication. For this reason, the ultraviolet lamp or lamps are preferably water-cooled and the air adjacent the curing resin should be kept moving, especially when the structure of the surface to be replicated has a geometry like that of an intermeshable article. In order to keep the temperature of the composition containing the oligomeric resin below about 50° C., it is also preferred to restrict the amount of the photoinitiator to no more than 0.5% by weight of the composition. However, when the amount of the photoinitiator is less than about 0.1% by weight of the composition, curing might proceed at an unsatisfactorily slow rate.

The temperature of the composition containing the oligomeric resin can also be prevented from rising above 50° C. during photopolymerization by controlling the intensity of irradiation. However, the intensity should be sufficient to complete the curing step at an economically rapid rate of production. When the thickness of the composition containing the oligomeric resin is about 0.025 mm, it usually is possible to complete the curing step within about one second while preventing the temperature of the resin composition from exceeding 50° C. Greater thicknesses require longer exposure times in order to keep the temperature desirably low, e.g., about 10 seconds for a thickness of about 0.5 mm.

It has been discovered that the intensity of the ultraviolet source has a substantial effect on the ultimate shear and peel values of the fasteners produced by this method. In particular, low intensity light sources and the concomitant slow cure rate are preferred. Light sources having an intensity of less than 65 mW/cm$^2$ are preferred and an intensity of less than 10 mW/cm$^2$ are especially preferred.

Although oxygen is a known inhibitor of photopolymerization, and incomplete reaction results unless it is rigorously excluded from the resin (see, for example, U.S. Pat. No. 4,329,384), it has been found that small amounts of oxygen may be desirable in the process of the present invention. The fasteners of the present invention can be produced in an inert atmosphere of nitrogen containing from 100 to 750 ppm oxygen, and preferably from 150 to 500 ppm oxygen. These minute quantities of oxygen are believed to inhibit photopolymerization solely at the surface of the resin, while photopolymerization is not inhibited in the remaining portion of the resin.

When the master is made of a thermoplastic resin that is transparent to ultraviolet radiation, a composite fastening component of the invention can be prepared by applying the composition containing the oligomeric resin to both major surfaces of a flat substrate. Each surface of the cured resin composition provides the capability of reclosable mechanical fastening.

A master negative molding surface formed from a thermoplastic resin can have a low-energy surface that affords good release from a cured composition containing the oligomeric resin. Good release is assured when there is a significant difference in surface tension between the surface of the master negative molding surface and the surface of the cured composition, the latter value typically being about 40–41 dynes/cm. Because the surface tension of each of polypropylene and polyethylene is about 30–31 dynes/cm, these polymers can easily be separated from the cured composition. However, when polypropylene is corona treated, its value of surface tension increases to about 44 dynes/cm, thereby rendering it questionable for use as the surface of the molding master.

Poly(vinyl chloride) and cellulose acetate butyrate, both of which have values of surface tension of about 39–42 dynes/cm, also provide good bonding with the cured surface of a composite fastening component, but cannot be used as the master negative molding surface without some sort of release agent.

A preferred master negative molding surface can be formed from a laminate of polyethylene and polypropylene that has been embossed with the polyethylene layer in contact with the metallic master tool at a temperature above the softening point of the polyethylene and below the softening print of the polypropylene. The polypropylene layer of the laminate affords the strength and flexibility needed to permit it to be flexed so as to evenly spread the oligomeric composition across a rigid master negative molding surface. Other polyolefins can also be used successfully.

The following tests were used to evaluate the properties of the fastening component of the present invention that relate to performance.

T-PEEL VALUE

This test was used to determine the peel force required to cause two fastening components to release from each other when the substrate of a composite fastening component was a flexible film having a length of at least 20 cm. After two identical composite fastening components were placed in contact, the two components were engaged by means of a 2-kg hard-rubber roller, one pass in each direction. After the engaged components were allowed to stand at ordinary room temperature for at least 30 seconds, one end of each component was secured to a jaw of an Instron tensile tester, and the jaws were moved apart at a rate of 30 cm/min. The T-Peel Value is reported in Newtons per decimeter (N/dm).

As a measure of the reproducibility of the T-peel value, the test was repeated on each of the samples and the second T-peel value was reported. Repetition of the test is important as it provides an indication of reuseability.

DYNAMIC SHEAR VALUE

This test was used to determine the amount of shear force required to cause two fastening components to release from each other. A pair of 1 in. ×4 in. (2.5 cm ×10 cm) fastening strips were secured together with a one square inch overlap. The strips were engaged by means of a 2-kg hard-rubber roller, one pass in each direction. After the engaged strips were allowed to stand at ordinary room temperature for at least 30 seconds, one end of each strip was secured to a jaw of an Instron tensile tester, and the jaws were separated at a rate of 30 cm/min. The dynamic shear value was reported in Newtons per square decimeter (N/dm$^2$).

In the examples, all parts are parts by weight, unless otherwise indicated.

EXAMPLE 1

A liquid ultraviolet-curable composition containing oligomeric resin was prepared by blending the following ingredients in the amounts indicated:

| Ingredient | Amount (parts by weight) |
|---|---|
| acrylate-capped polycaprolactone urethane oligomer | 47 |
| butylcarbamoyl ethyl acrylate | 16 |
| N-(isobutoxy methyl)acrylamide | 13 |
| [(2-ethoxy)-2-ethoxyl]ethyl acrylate | 24 |
| 1-hydroxycyclohexyl acetophenone | 0.25 |

The acrylate-capped polycaprolactone urethane oligomer was prepared as described in Example 1 of U.S. Pat. No. 4,576,850 except that 0.75 mole of polycaprolactone triol ("Niax" PCP-310, available from Union Carbide) was employed in addition to the 1.5 moles of the diol, and 2-hydroxyethyl acrylate was employed instead of the methacrylate.

A film of poly(vinyl chloride) (0.0375 mm in thickness) was used as a planar substrate. The liquid ultraviolet-curable composition containing the oligomeric resin was poured onto the poly(vinyl chloride) substrate. Over the composition was placed a biaxially oriented polypropylene liner film having a thickness of 0.05 mm, to protect the oligomeric resin from exposure to atmospheric oxygen, as described in U.S. Pat. No. 4,329,384, incorporated herein by reference. Excess composition was squeezed out by pressing a knife coater having a 0.127 mm gap over the liner film, thereby leaving a composite having a uniform thickness of about 0.125 mm. Both major surfaces were irradiated by passing the composite between two banks of low-intensity, ultraviolet lamps at 2 mW/cm$^2$ to provide a total exposure of 900 mJ.

The resulting composite fastening component was stripped from the surface of the polypropylene liner and the fastening layers of two pieces of each fastening component were secured together and tested. The results are reported in Table I.

EXAMPLES 2 and 3

Composite fastening components were prepared and tested as in Example 1, except that in Example 2, the thickness of the fastening layer, i.e., the layer containing oligomeric resin, was 0.25 mm, and in Example 3, the thickness of the fastening layer was 0.375 mm. The peel values reported in Table I are in N/dm and the shear values reported in Table I are in N/dm$^2$.

TABLE I

|  | Example | | |
|---|---|---|---|
|  | 1 | 2 | 3 |
| T-Peel value after | | | |
| 30 seconds | 12.1 | 12.2 | 19.6 |
| 60 seconds | 13.1 | 17.5 | 24.2 |
| 90 seconds | 13.1 | 19.6 | 25.9 |
| 120 seconds | 12.6 | 20.1 | 25.9 |
| Second T Peel value after | | | |
| 2 minutes | 12.2 | 17.5 | 23.4 |
| 4 hours | 13.1 | 19.2 | 26.2 |
| 6 days at 70° C. | 39.4 | 41.1 | — |
| Dynamic shear value | 75.9 | 88.3 | 95.3 |
| failure mode | broke[1] | pop-off[2] | pop-off[2] |

[1] "broke" means that the backing substrate broke.
[2] "pop-off" means that the fastening components separated, but that there was no cohesive failure of the oligomeric resin layer.

The surface of the fastening layer of each of the composite fastening components of Examples 1-3 was non-tacky to the touch.

Examples 1-3 demonstrate that the peel and shear values of the fastening components increase with the thickness of the fastening layer.

EXAMPLES 4-16

The procedure of Example 1 was repeated with the exceptions that (1) different radiation equipment was used, namely, a low intensity (about 3 mW/cm$^2$) ultraviolet light source that was operated to provide an exposure of 432 mJ through the mold and 429 mJ through the liner, and (2) various other liquid ultraviolet-curable compositions containing oligomeric resin were used. The composition containing oligomeric resin of Example 4 was identical to that of Example 1. The composition containing oligomeric resin of Example 5 was identical to that of Example 1, except that the composition of Example 5 contained 2,2-dimethoxy-2-phenyl-acetophenone ("IRGACURE" 651, Ciba-Geigy Corporation) as the photoinitiator. Abbreviations in Table II are as follows:

APUO = acrylate-capped polycaprolactone urethane oligomer
BCEA = butyl carbamoyl ethyl acrylate
N-IBMA = N-(isobutoxy methyl)acrylamide
EEEA = [(2-ethoxy)-2-ethoxyl]ethyl acrylate
PEA = phenoxyethyl acrylate
IBA = isobutyl acrylate
IOA = isooctyl acrylate
BA = butyl acrylate
THFFA = tetrahydrofurfuryl acrylate
NVP = N-vinyl pyrrolidone
HEA = hydroxy ethyl acrylate
DMAEA = dimethyl amino ethyl acrylate
EEA = ethoxy ethyl acrylate
HCHA = 1-hydroxycyclohexyl acetophenone
DMPA = 2,2-dimethoxy-2-phenyl acetophenone

TABLE II

| Example | 4 | 5 | 6 | 7 | 8 | 9 | 10 | 11 | 12 | 13 | 14 | 15 | 16* |
|---|---|---|---|---|---|---|---|---|---|---|---|---|---|
| APUO | 47 | 47 | 47 | 47 | 47 | 56 | 47 | 47 | 47 | 47 | 47 | 47 | 46.7 |
| BCEA | 16 | 16 | 16 | 16 | 16 |  | 16 | 16 | 16 | 16 | 16 | 16 | 15.6 |
| N-IBMA | 13 | 13 | 13 | 13 | 13 |  | 13 | 13 | 13 | 13 | 13 | 13 | 12.8 |
| EEEA | 25 | 25 |  |  |  |  |  |  |  |  |  |  |  |
| PEA |  |  | 25 |  |  | 25 |  |  |  |  |  |  |  |
| IBA |  |  |  | 25 |  |  |  |  |  |  |  |  |  |
| IOA |  |  |  |  | 25 | 19 |  |  |  |  |  |  |  |
| BA |  |  |  |  |  |  | 25 |  |  |  |  |  |  |
| THFFA |  |  |  |  |  |  |  | 25 |  |  |  |  |  |
| NVP |  |  |  |  |  |  |  |  | 25 |  |  |  |  |
| HEA |  |  |  |  |  |  |  |  |  | 25 |  |  |  |
| DMAEA |  |  |  |  |  |  |  |  |  |  | 25 |  |  |
| EEA |  |  |  |  |  |  |  |  |  |  |  | 25 | 25 |
| HCHA | 0.25 |  |  |  |  |  |  |  |  |  |  |  |  |

TABLE II-continued

| Example | 4 | 5 | 6 | 7 | 8 | 9 | 10 | 11 | 12 | 13 | 14 | 15 | 16* |
|---|---|---|---|---|---|---|---|---|---|---|---|---|---|
| DMPA | | 0.25 | 0.25 | 0.25 | 0.25 | 0.25 | 0.25 | 0.25 | 0.25 | 0.25 | 0.25 | 0.25 | 0.25 |
| 1st T-Peel (N/dm) | | | | | | | | | | | | | |
| 30 seconds | 21.9 | 18.0 | 15.8 | 1.7 | 13.0 | 16.6 | 19.3 | 18.6 | | 18.7 | 7.0 | 49.9 | 10.2 |
| 60 seconds | 28.4 | 28.9 | 15.8 | 1.4 | 22.8 | 19.3 | 18.2 | 18.9 | | 19.6 | 7.4 | 48.1 | 12.6 |
| 120 seconds | 28.4 | 30.1 | 17.5 | 2.5 | 21.9 | 18.7 | 21.7 | 18.9 | | 17.5 | 6.1 | 48.1 | 13.7 |
| 5 minutes | 27.8 | 31.2 | 17.5 | 2.5 | 21.9 | 18.4 | 22.4 | 24.2 | | 18.4 | 5.6 | 35.0 | 13.5 |
| 2nd T-Peel (N/dm) | | | | | | | | | | | | | |
| 30 seconds | 19.2 | 18.0 | 12.4 | | 16.6 | 14.4 | 18.9 | 18.4 | | 15.9 | 6.8 | 38.5 | 8.8 |
| 1 minute | 21.9 | 23.6 | 16.6 | | 16.6 | 14.0 | 18.2 | 18.6 | | 17.0 | 7.7 | 52.5 | 13.1 |
| 2 minute | 25.4 | 26.6 | 19.6 | | 15.8 | 12.3 | 17.5 | 18.4 | | 17.0 | 7.4 | 29.8 | 14.0 |
| 7 days at 70° C. | 45.2 | 43.4 | 61.3 | 3.5 | 73.9 | 24.2 | 35.0 | 218.8 | 37.1 | 17.5 | 87.5 | | |
| Dynamic shear (N/dm$^2$) | 97.7 | 85.5 | 101.2 | 97.7 | 101.2 | 90.7 | 111.7 | 97.7 | 41.9 | 101.2 | 80.3 | 108.2 | 87.3 |

*The resin used in Example 16 was an acrylate-capped urethane oligomer commercially available from Morton Thiokol, Product No. ZL-1580.

The data in Table II indicate that the fastening components of the present invention can be made with a wide variety of monomers. Certain monomers substantially increase the modulus of the resulting polymer, rendering them somewhat rigid and non-conformable. All compositions except for the one in Example 9 include butyl carbamoyl ethyl acrylate. This additive was used to lower the viscosity of the resin, but is not required.

Examples 7, 12, and 14 demonstrate that the use of monomers that result in an increase in the modulus of the photopolymerized material provide a fastener that is too glassy to permit satisfactory compliance. Example 16 demonstrates that a commercially available urethane acrylate resin can be used to produce a satisfactory fastening component. Example 9 demonstrates that BCEA can be eliminated from the resin without deleteriously affecting the resultant fastening component. Examples 4 and 5 demonstrate two different photoinitiators that can be used in the present invention. Examples 6, 8, 10, 11, 13, 15, and 16 demonstrate the range of monomers that can be used without deleteriously affecting the resultant fastening component.

EXAMPLES 17 AND 18

The fastener of Example 17 was made using the resin of Example 1 by the procedure disclosed in U.S. Pat. No. 4,576,850. The resin was cast in a master mold made of polypropylene/polyethylene laminate and photopolymerized by means of a high intensity ultraviolet light source of 61.2 mW/cm$^2$. The fastener had a substrate made of poly(vinyl chloride) and having a thickness of 0.051 mm. The cured oligomer had a sawtooth pattern, with a depth of 0.178 mm, a peak-to-peak separation of 0.356 mm, and 90° angles between adjacent surfaces. T-Peel values were measured as in the previous examples, along the axes both parallel and perpendicular to the grooves formed by the sawtooth pattern. The results are set forth in Table III.

The fastener of Example 18 was prepared in the same manner as was the fastener of Example 17, with the exception that a low intensity light source of 2.83 mW/cm$^2$ was used. T-Peel values were again measured along the axes both parallel and perpendicular to the grooves of the sawtooth pattern. The results are set forth in Table III.

COMPARATIVE EXAMPLE A

Example 17 was repeated with the only exception being that a high-intensity light source of 80.6 mW/cm$^2$ was used. The results are set forth in Table III.

TABLE III

| Example | Light intensity (mw/cm$^2$) | T-Peel (parallel) (N/dm) | T-Peel (perpendicular) (N/dm) |
|---|---|---|---|
| 17 | 61.2 | 20.3 | 22.8 |
| 18 | 2.83 | 13.3 | 13.1 |
| Comparative A | 80.6 | 5.2 | 5.8 |

Examples 17 and 18, and Comparative Example A demonstrate that the use of high intensity sources are detrimental to the performance of the fasteners.

EXAMPLES 19-31

Examples 19 to 31 demonstrate the effect of using a dual liner cure system, either employing various cover films having varying levels of permeability to ambient oxygen, or employing a single cover film in a nitrogen atmosphere with a controlled oxygen content.

Each sample was prepared using the resin of Example 1 coated to a thickness of 0.127 mm on 0.037 mm poly(vinyl chloride) backing. The total energy was 900 mJ, with an intensity of 4.4 mW/cm$^2$. The cover film (where used) and the oxygen levels are shown in Table IV. T-Peel values were measured according to the procedure described previously. Abbreviations used in Table IV are as follows:

BOPP=biaxially oriented polypropylene
SiBOPP=silicone coated biaxially oriented polypropylene
SiPET=silicone coated polyethylene terephthalate
PET=polyethylene terephthalate
PTFE=polytetrafluoroethylene ("Teflon")

The oxygen permeability coefficient of biaxially oriented polypropylene is $2.3 \times 10^{10}$, the permeability coefficient of polyethylene terephthalate is $0.035 \times 10^{10}$, and the permeability coefficient of polytetrafluoroethylene is $4.2 \times 10^{10}$. The permeability coefficients for the silicone coated films are not available.

TABLE IV

| | 19 | 20 | 21 | 22 | 23 | 24 | 25 | 26 | 27 | 28 | 29 | 30 | 31 |
|---|---|---|---|---|---|---|---|---|---|---|---|---|---|
| Cover film | BOPP | SiBOPP | PTFE* | PET | SiPET | PTFE | BOPP | SiBOPP | PET | — | — | — | — |
| Oxygen level | air | air | air | air | air | 16 ppm | 16 ppm | 16 ppm | 16 ppm | 16 ppm | 176 ppm | 285 ppm | 540 ppm |
| T-Peel value (N/dm) after | | | | | | | | | | | | | |
| 30 seconds | 34.1 | 15.8 | 24.0 | 7.0 | 4.7 | 3.5 | 3.0 | 2.6 | 2.8 | 3.5 | 18.4 | 24.5 | 17.5 |

TABLE IV-continued

|  | 19 | 20 | 21 | 22 | 23 | 24 | 25 | 26 | 27 | 28 | 29 | 30 | 31 |
|---|---|---|---|---|---|---|---|---|---|---|---|---|---|
| 60 seconds | 33.2 | 21.9 | 34.5 | 15.2 | 6.1 | 3.7 | 2.6 | 3.0 | 3.2 | 4.0 | 17.5 | 17.5 | 27.1 |
| 2 minutes | 33.2 | 21.4 | 35.0 | 16.6 | 5.8 | 3.5 | 3.2 | 3.0 | 3.8 | 3.5 | 15.8 | 17.5 |  |
| 5 minutes | 34.1 | 21.5 | 35.0 | 10.0 | 5.2 | 3.0 | 3.3 | 2.8 | 3.5 | 3.0 | 19.2 | 16.6 |  |

*The sample was tacky to the touch, and, therefore, unacceptable.

Examples 19-23 demonstrate that the composition containing the oligomeric resin may be cured in air using a cover film as described in U.S. Pat. No. 4,329,384. In Example 28, in which the composition containing the oligomeric resin was cured without a cover film in a nitrogen atmosphere containing 16 ppm oxygen, T-peel values were low. In Examples 24-27, in which the compositions containing the oligomeric resins were cured with a cover film in a nitrogen atmosphere containing 16 ppm oxygen, T-peel values were low. Example 29 demonstrates that the samples need not be cured with a cover film if a controlled oxygen atmosphere is used.

EXAMPLE 32

A liquid ultraviolet-curable composition containing oligomeric resin was prepared by blending the following ingredients in the amounts indicated:

| Ingredient | Amount (parts by weight) |
|---|---|
| methacrylate-capped polypropylene glycol urethane oligomer | 99 |
| 2-hydroxy-2-methyl-1-phenyl-propan-1-one ("Darocure" 1173, E. Merck Chemische Fabrik) | 1 |

The methacrylate-capped polypropylene glycol urethane oligomer was prepared as described in Example 1 of U.S. Pat. No. 4,576,850, except that 2,2,4-trimethylhexamethylene diisocyanate was employed instead of isophorone diisocyanate. The methacrylate used was propylene glycol monomethacrylate having five —OCH$_2$CH(CH$_3$)— units. The liquid ultraviolet-curable composition containing the oligomeric resin was poured onto a micro-grooved master tool made of nickel. Over the composition was placed a biaxially oriented polyethylene terephthalate liner film having a thickness of 0.15 mm, to protect the oligomeric resin from exposure to atmospheric oxygen, as described in U.S. Pat. No. 4,329,384, incorporated herein by reference. Excess composition was squeezed out by drawing a polytetrafluorethylene squeegee over the composition in the direction of the microgrooves. The composition was irradiated by passing the composite through a RPC medium pressure ultraviolet lamp processor using two lamps, each at 300 Watts/in at a speed of 30 ft/min for a total exposure of 300 mJ/cm$^2$.

The resulting composite fastening component was stripped from the surface of the master tool, and the fastening layers of each fastening component were secured together.

EXAMPLE 33

Example 32 was repeated with the sole exception that 20% by weight of the oligomer was replaced by an equivalent amount of 1,6-hexanediol diacrylate.

EXAMPLE 34

Example 33 was repeated with the sole exception that neo-pentyl glycol diacrylate was used instead of 1,6-hexanediol diacrylate.

EXAMPLE 35

Example 33 was repeated with the sole exception that trimethylol propane triacrylate was used instead of 1,6-hexanediol diacrylate.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A fastening component of a reclosable mechanical fastener, which fastening component comprises:
   (a) a substrate, and
   (b) a fastening layer having a first major surface and a second major surface, said first major surface being adhered to said substrate, said second major surface being non-tacky, substantially flat, and comprising a crosslinked polymer formed from radiation-curable, addition-polymerizable, oligomers or prepolymers having one or more like or different hard segments of mono- or poly-valent moieties containing one or more carbocyclic or heterocyclic groups or both said moieties, wherein each of said moieties of said hard segments, when their valences are satisfied by protons, has at least one major transition temperature above 250° K., one or more like or different soft segments of mono- or poly-valent moieties, wherein each of said moieties of said soft segments has a number average molecular weight in the range of about 500 to 5000 and each of which in the form of homopolymer has a glass transition temperature below 250° K., one or more like or different monovalent moieties containing a radiation-sensitive, addition-polymerizable, functional group selected from the group consisting of acrylyl, methacrylyl, allyl, and vic-epoxy, said second major surface capable of releasably adhering to an identical second major surface of a second fastening layer.

2. A fastening component according to claim 1, wherein said substrate has a tensile strength of at least 1500 MPa.

3. A fastening component according to claim 4, wherein said substrate can be bent to a radius of 0.5 cm without breaking.

4. A fastening component according to claim 1, wherein the substrate comprises a thermoplastic film.

5. A fastening component according to claim 1, wherein said fastening layer is formed from a photopolymerizable composition comprising:
   (i) an ultraviolet radiation-curable, radiation addition-polymerizable, crosslinkable, organic oligomeric resin having one or more like or different hard segments of mono- or poly-valent moieties containing one or more carbocyclic or heterocyclic groups or both said moieties, wherein each of said moieties of said hard segments, when their valences are satisfied by protons, has at least one major transition temperature above 250° K., one or more like or different soft segments of mono- or polyvalent moieties, wherein each of said moieties of said soft segments has a number average molecular weight in the range of about 500 to 5000 and each of which in the form of homopolymer has a glass transition temperature below 250° K., and one or more like or different monovalent moieties containing a radiation-sensitive, addition-polymerizable, functional group selected from the group consisting of acrylyl, methacrylyl, allyl, and epoxy, and vic-epoxy, (ii) an ethylenically unsaturated monomer, wherein said ethylenically unsaturated monomer is an alkyl acrylate wherein said alkyl moiety contains a straight chain having four to twelve carbon atoms, and (iii) a photoinitiator.

6. A fastening component according to claim 5, wherein said alkyl acrylate is [(2-ethoxy)-2-ethoxy]ethyl acrylate.

7. A fastening component according to claim 5, wherein said alkyl acrylate is ethoxy ethyl acrylate.

* * * * *

UNITED STATES PATENT AND TRADEMARK OFFICE
CERTIFICATE OF CORRECTION

PATENT NO. : 5,196,266

DATED : March 23, 1993

INVENTOR(S) : Lu et al.

It is certified that error appears in the above-identified patent and that said Letters Patent is hereby corrected as shown below:

Col. 14, line 58, Claim 3 should depend from claim 2 instead of claim 4.

Signed and Sealed this

Fifteenth Day of March, 1994

Attest:

BRUCE LEHMAN

Attesting Officer    Commissioner of Patents and Trademarks